May 19, 1925.
E. B. CAMPBELL
ANTIFRICTION ACCELERATOR PEDAL
Filed Sept. 11, 1923
1,538,088
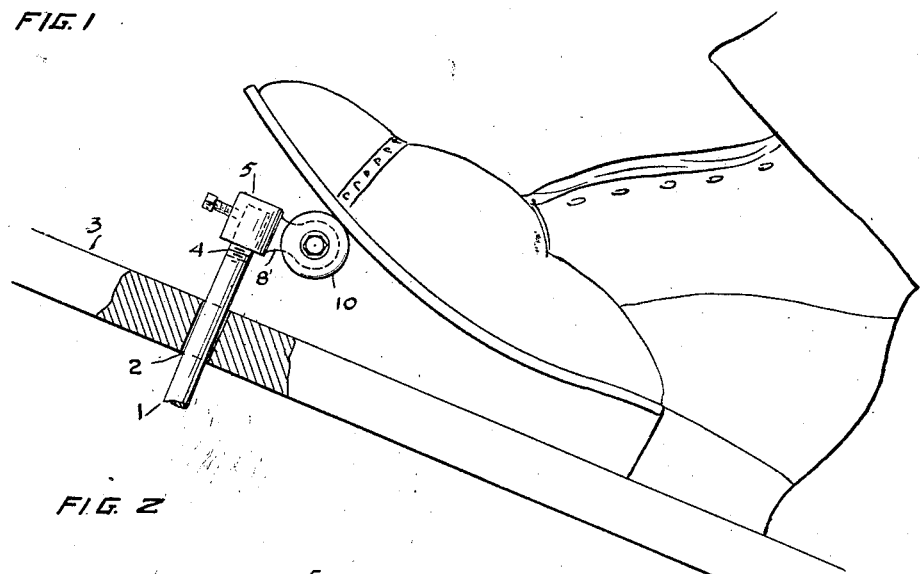
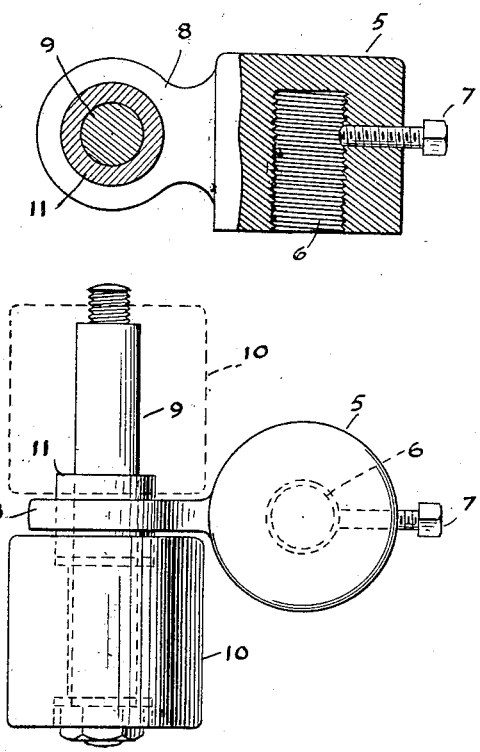
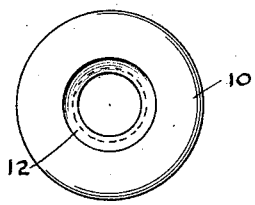
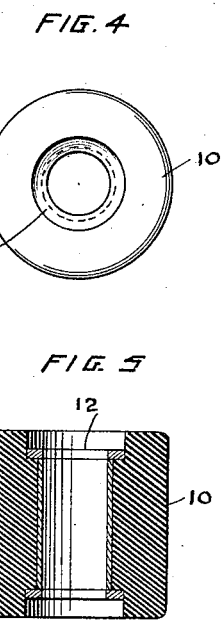
INVENTOR
E. B. CAMPBELL
ATT'YS.

Patented May 19, 1925.

1,538,088

UNITED STATES PATENT OFFICE.

EMERSON B. CAMPBELL, OF LONG BEACH, CALIFORNIA.

ANTIFRICTION ACCELERATOR PEDAL.

Application filed September 11, 1923. Serial No. 662,063.

*To all whom it may concern:*

Be it known that I, EMERSON B. CAMPBELL, a citizen of the United States, residing at Long Beach, in the county of Los Angeles and State of California, have invented new and useful Improvements in Antifriction Accelerator Pedals, of which the following is a specification.

This invention relates to improvements in automobile accelerators and more particularly to an improved pedal for such devices.

The primary object of the invention is to provide a simply constructed, antifriction accelerator pedal which is capable of being readily substituted for the ordinary disk or button type of pedal and will provide for a more accurate, positive, comfortable and convenient operation of the accelerator mechanism than is possible with the button pedal, which latter, being usually formed of metal, sets up considerable wearing friction on the shoe of the operator and becomes uncomfortably hot in hot weather.

Another object of the invention is to provide a pedal of the character described which embodies a main casting so constructed that it may be readily attached to the pedal stem of the accelerator on removal of the button or other type of pedal, and an antifriction pedal member, preferably in the form of rollers, mounted on the main casting so that it may be effectively engaged by the foot of the operator of the accelerator and will rotate when the operator depresses and releases the pedal, said roller being formed of material which is highly resistant to heat conduction and radiation, such as rubber, wood, paper pulp and the like. By this rotating of the pedal rollers on operating the accelerator the operation is a smooth and reliable one, free from unpleasant and wearing friction.

With the above mentioned and other objects in view, the invention consists in the novel construction and combination of parts hereinafter described, illustrated in the accompanying drawings, and set forth in the claims hereto appended, it being understood that various changes in the form, proportion, size and minor details of construction within the scope of the claims may be resorted to without departing from the spirit or sacrificing any of the advantages of the invention.

Referring to the drawing:

Fig. 1 is a side elevation of the pedal of my invention as it would appear when in use.

Fig. 2 is a fragmentary sectional view of the casting shown without the rollers and partly in side elevation.

Fig. 3 is a top plan view of the pedal, one of the rollers being removed.

Fig. 4 is a side elevation of one of the rollers.

Fig. 5 is a cross section of one of the rollers.

The embodiment of the invention shown in the accompanying drawing is adapted to be used in connection with automobile accelerators of the type having an upright pedal stem 1, extending through an opening 2 in the floor boards 3, of an automobile. The upper end of this stem is usually threaded as at 4 to provide for attachment of the disk or button type of pedal, not shown, now generally used in automobiles.

The pedal of my invention comprises a body portion 5 in the form of a casting having a threaded socket 6 formed therein and a set screw 7 extending into the socket. Thus on removal of the old type pedal, not shown, the socketed body may be screwed onto the threaded upper end of the stem 1 and locked in place by the set screw 7.

The casting has an integral lateral extension 8 on one side, extending transversely through which is an axle pin 9 suitably secured to the extension. Two rollers 10 are rotatably mounted on the axle 9 on opposite sides of the extension 8 with their upper surfaces disposed well above the upper sides of the casting and extension whereby the foot of the operator is prevented from contacting with said casting and extension.

These rollers are made of material such as rubber, wood, pulp, etc., which is resistant to heat conducting and radiation and have metal bushings 11 for bearings. Any suitable means may be provided for holding the rollers on the axle, said rollers being countersunk at opposite sides as at 12, to provide for disposition of said means By having two rollers, a wheel tread is provided for the pedal of my invention and this insures comfort and convenience of operation. The rollers will turn freely on depressing the pedal with the foot and thereby provide for an easy, smooth operation, free from friction and discomfort caused by friction.

The ordinary metal pedal especially of the disk or button type, becomes very hot in summer weather on long drives, and thereby proves uncomfortable to the driver. With my pedal where the rollers are made of wood, rubber, or the like, the pedal does not become uncomfortably heated and prove objectionable to the driver. Where rubber is used, the yield of the rollers will prevent that objectionable "hardness" experienced in the constant holding of a metal pedal depressed on long drives.

My pedal is compact, small and inexpensive and a point of great importance relating thereto is that it is readily and easily applicable to the majority of makes of automobiles.

I claim:

1. An improved pedal for automobile accelerators comprising a body portion provided with means for removably attaching the same to the pedal stem of an accelerator, and means carried by the body portion for supporting a pair of rollers with the upper surface of said rollers disposed above the plane of the body portion.

2. An improved automobile pedal for automobile accelerators comprising a body portion having means providing for removably attaching the body portion to the pedal stem of an accelerator after removal of the pedal from the stem, a member extending outwardly from the body portion, a pin carried by and extending transversely of said member and rollers mounted on the pin and disposed on opposite sides of the outwardly projecting portion.

EMERSON B. CAMPBELL.